United States Patent [19]

Bird

[11] Patent Number: 5,605,357
[45] Date of Patent: Feb. 25, 1997

[54] PIPE COLLAR

[75] Inventor: Edwin A. Bird, Ashdown, Ark.

[73] Assignee: M&FC Holding Co., Wilmington, Del.

[21] Appl. No.: 461,115

[22] Filed: Jun. 5, 1995

[51] Int. Cl.⁶ ............................................. F16L 55/172
[52] U.S. Cl. .......................... 285/15; 285/373; 285/379
[58] Field of Search ........................... 282/373, 379, 282/419, 15

[56] References Cited

U.S. PATENT DOCUMENTS

| | | | |
|---|---|---|---|
| 2,689,140 | 9/1954 | Bonalli | 285/69 |
| 2,690,193 | 9/1954 | Smith | 285/373 |
| 3,467,141 | 9/1969 | Smith | 285/373 |
| 4,109,944 | 8/1978 | Curtin | 285/373 |
| 4,768,813 | 9/1988 | Timmons | 285/373 |
| 5,018,548 | 5/1991 | McLennan | 285/373 |
| 5,037,141 | 8/1991 | Jardine | 285/177 |
| 5,121,946 | 6/1992 | Jardine | 285/15 |
| 5,295,716 | 3/1994 | Bridges | 285/373 |

FOREIGN PATENT DOCUMENTS

| | | | |
|---|---|---|---|
| 547986 | 11/1959 | Belgium | 285/373 |
| 2189000 | 10/1987 | United Kingdom | F16L 55/16 |

*Primary Examiner*—Eric K. Nicholson
*Attorney, Agent, or Firm*—Wood, Herron & Evans, P.L.L.

[57] ABSTRACT

A pipe collar comprising first and second arcuate shell members, clamping means for drawing the shell members together around a pipe, and improved sealing means disposed in each of the shell members, for facilitating sealing engagement between the pipe collar and the pipe, and between the respective shell member sealing means.

20 Claims, 4 Drawing Sheets

PIPE COLLAR

FIELD OF THE INVENTION

The invention relates to collars for pipes, and is directed particularly to repair collars and/or jointing collars having improved sealing means therein.

BACKGROUND OF THE INVENTION

Pipe collars of the general type herein concerned are known in the art. It is known, for example, to provide a pipe collar having first and second arcuate shell members with clamping means for drawing the shell members together around a pipe. It is further known to provide first and second elastomeric arcuate sealing means respectively disposed interiorly of each shell member, and wedge members disposed between the shell members and adapted to slide on interior surfaces of the shell members as the shell members are drawn together by the clamping means. Each of the arcuate sealing means are known to comprise a pair of circumferential sealing strips spaced apart, and interconnected, by axial sealing strips which slidingly engage the interior surfaces of the shell members, and by axial end sealing strips, two of which contact each other to form a seal between two opposed ends of the sealing means. It is known that both sets of axial sealing strips are disposed in grooves in the wedge members. A pipe collar of this construction is shown and described in British Patent No. 2,189,000, published Nov. 22, 1989, in the name of Robert W. Jardine.

In the Jardine pipe collar, each of the end sealing strips is disposed in an axial, or longitudinal, groove in the end of a wedge member. Each end sealing strip is rectangular in width-wise cross section and upstands from the wedge member end surface in which its respective groove is located. In an effort to encourage pairs of opposed end sealing strips to properly engage one another, each wedge member is provided at its end with inclined width-wise extending ramp surfaces adapted to engage with oppositely inclined ramp surfaces of the opposite wedge. While the ramp surface arrangement may be beneficial with respect to correction of width-wise misalignment of the end sealing strips, it is not instrumental in leading to proper length-wise alignment of the end sealing strips, and thereby the two sealing means. Further, because of the rectangular shape of the end sealing strips, the goal of the ramp surfaces is sometimes thwarted by a side-by-side mating of two end sealing strips.

In the Jardine pipe collar, each of the sliding sealing strips is rectangular in cross section and is wholly contained within its groove in its wedge member. Because the sliding sealing strip is substantially flush with the wedge member surface, its sealing effectiveness is minimal.

Additionally, the circumferential sealing strips of the Jardine collar are substantially flat on the side of the strip that contacts the pipe. Thus, substantial force must be applied to conform the thick, rigid ends of the strip to the pipe. This creates undesirable stresses within the collar, and makes assembly difficult.

Moreover, when the Jardine pipe collar is used with pipe large enough in diameter to require stretching of the circumferential sealing strips, it often happens that the ends of the sliding sealing strips, at their junctures with the circumferential sealing strips, are pulled from their respective grooves in the wedge members, opening leakage avenues between the pipe and the collar, greatly lessening the effectiveness of the sealing means.

Accordingly, it is deemed beneficial to provide a pipe collar of general construction similar to Jardine's, but having improved sealing capabilities, and in particular, sealing capabilities overcoming the inadequacies of the Jardine collar.

SUMMARY OF THE INVENTION

It is, therefore, an object of the invention to provide a pipe collar of the type above described, in which the end sealing strips are configured to provide proper lengthwise alignment, as well as improved widthwise alignment.

A further object of the invention is to provide a pipe collar of the type above described, in which the sliding sealing strips are configured for improved sealing capabilities while retaining acceptable sliding capabilities.

A further object of the invention is to provide a pipe collar to the type above described, in which the circumferential sealing strips will conform to a pipe under only minimal force.

A further object of the invention is to provide a pipe collar of the type above described, in which the axially extending end sealing strips and sliding sealing strips are permanently bonded to their respective wedge members in their respective grooves and not amenable to pulling therefrom.

A still further object of the invention is to provide a pipe collar of the type above described having wedge members of construction affording improved longevity in service.

With the above and other objects in view, as will hereinafter appear, a feature of the present invention is the provision, in a pipe collar as above described, of end sealing strips, each of which in side elevation has an engagement surface of a zig-zag configuration and is disposed in a wedge member end groove. The end sealing strips engagement surfaces are complementary to each other, such that a peak of a first end sealing strip is adapted to be received by a valley of a second, and opposed, end sealing strip; whereby, upon engagement of the first and second end sealing strips, the strips are urged into interfitting relationship, thereby to properly position the arcuate sealing means lengthwise thereof.

In accordance with a further feature of the invention, there are provided, in a pipe collar of the Jardine type, end sealing strips each provided with beveled edges and an engagement surface, which edges and surface extend beyond an end surface of the wedge in which the end sealing strip is disposed, such that opposed end sealing strips, upon engagement with each other, are adapted to slide one upon the other to bring the respective engagement surfaces of the opposed end sealing strips into engagement with each other.

In accordance with a further feature of the invention, there are provided, in a pipe collar of the Jardine type, sliding sealing strips disposed each in an axial groove in a wedge member, the sliding sealing strips each being provided with beveled edges and an engagement surface, which edges and surface extend beyond an arcuate member engagement surface of the wedge member in which the sliding sealing strip is disposed.

In accordance with a further feature of the invention, there are provided, in a pipe collar of the Jardine type, circumferential sealing strips having pipe contact surfaces which are radiused at the thick, rigid ends of the strips to allow the strip to conform to the pipe under minimal force.

In accordance with a still further feature of the invention, the end sealing strips and sliding sealing strips are vulcanized to their respective wedge members so as to render virtually impossible the dislodgment of the sealing strips from their respective grooves.

In accordance with a still further feature of the invention, there is provided, in a pipe collar of the Jardine type, wedge members in which the outer surface thereof is of the same material as the sealing strips.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWING

Reference is made to the accompanying figures in which is shown an illustrative embodiment of the invention, from which its novel features and advantages will be apparent.

In the Figures.

DESCRIPTION OF THE PREFERRED EMBODIMENTS

Figure 1:
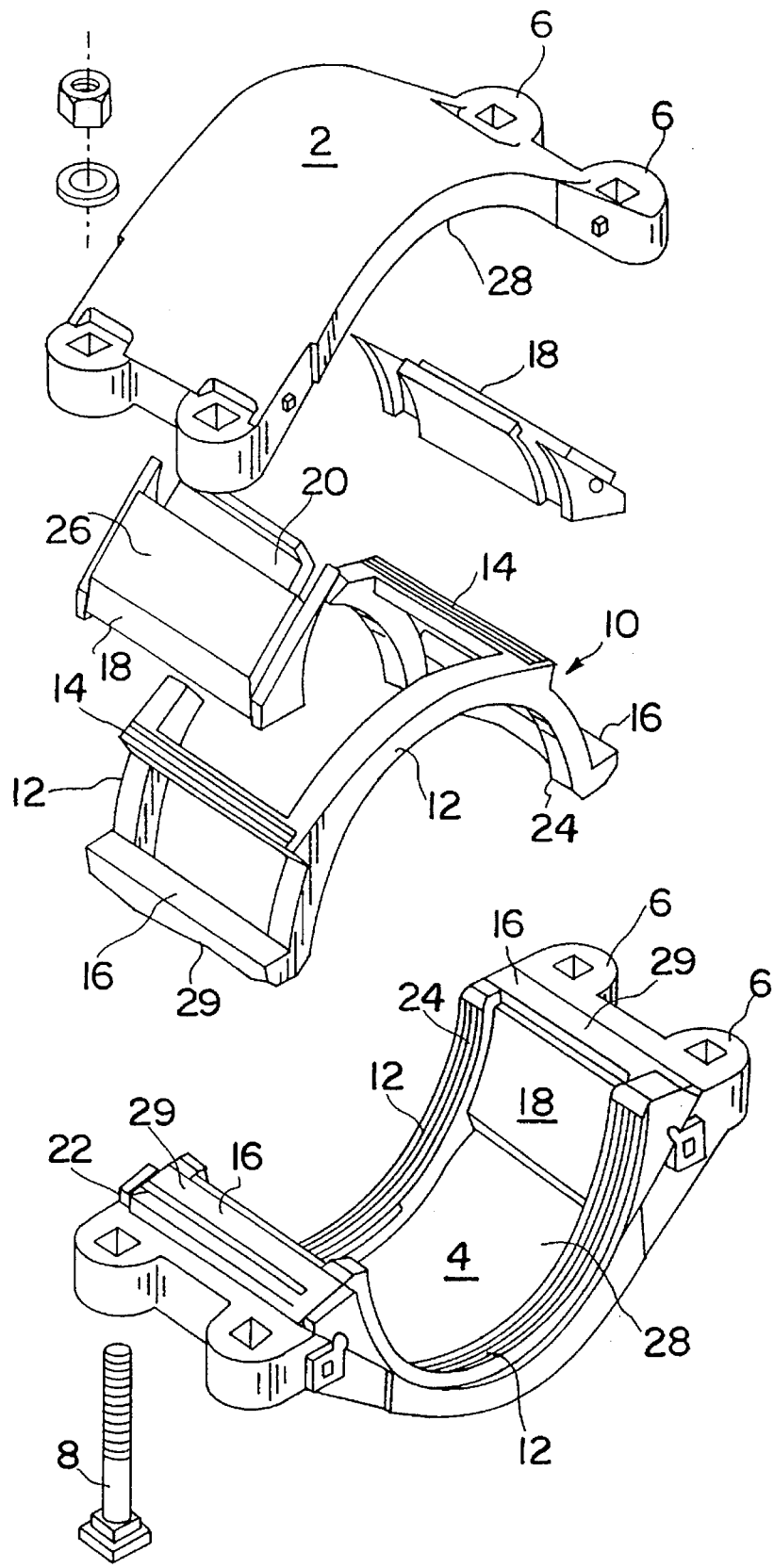
FIG. 1 is an exploded perspective view of one form of pipe collar illustrative of an embodiment of the invention.
Figure 2:
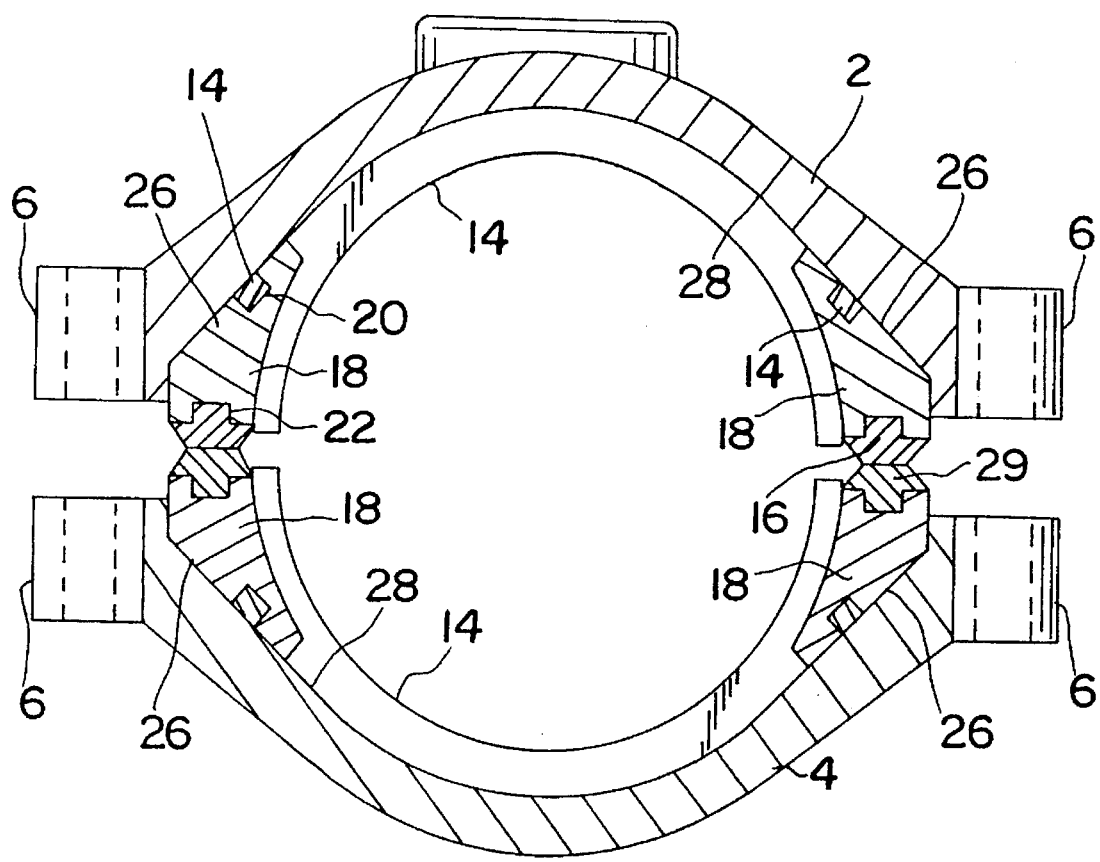
FIG. 2 is a sectional view of the pipe collar of FIG. 1.

Referring to FIGS. 1 and 2 of the drawings, it will be seen that an illustrative embodiment of the invention includes first and second arcuate shell members 2, 4 of rigid material adapted to remain intact for decades in an underground environment. Each shell member has at each end thereof outwardly extending lugs 6 adapted to receive bolts 8. The lugs 6 and the bolts 8 serve as clamping means for drawing the shell members 2, 4 together around a pipe (not shown), or a pair of pipe ends (not shown).

Each of the shell members 2, 4 receives an elastomeric sealing assembly 10. Each of the sealing assemblies 10 includes a pair of circumferential sealing strips 12 spaced apart and interconnected by axially extending sliding sealing strips 14 and axially extending end sealing strips 16. The end sealing strips 16 join ends of the circumferential sealing strip 12. The sliding sealing strips 14 extend between the circumferential sealing strips 12 at positions on the circumferential sealing strips spaced from the ends thereof and thereby spaced from the end sealing strips 16.

Proximate each pair of the lugs 6, and disposed between the arcuate shell members, 2, 4, and adjacent part of the sealing assembly 10 is a wedge member 18. Each wedge member 18 is retained in position on its elastomeric sealing assembly by means of the axially extending sliding sealing strips 14 and the end sealing strips 16 being disposed, respectively, in grooves 20 and end grooves 22 in the wedge members.

Figure 3:
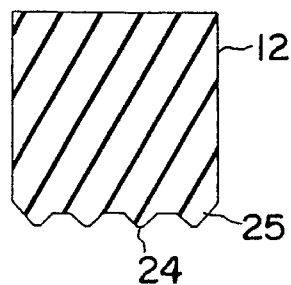
FIG. 3 is center sectional view of a circumferential sealing strip according to the invention.

The sealing assembly circumferential sealing strips 12 are provided with internally protruding ribs 24 which serve to prevent axial movement of the sealing assembly 10 on the pipe and serve to effect sealing with the periphery of the pipe. Referring also to FIG. 3, the sealing strips 12 are provided with beveled edges 25 which facilitate sliding of the strips 12 and proper alignment of the members 2, 4 during assembly.

Each of the wedge members 18 has a shell member engagement surface 26 which slidingly abuts an inner face 28 of one of the shell members 2, 4. As the shell members 2, 4 are drawn together by the bolts 8, the wedge members 18 are caused to slide within the shell members to force the elastomeric sealing assemblies 10, and particularly the circumferential sealing strips 12, inwardly against the pipe in the region of the lugs 6. There results a substantially uniform compression of the sealing assembly 10 around the pipe, effecting a fluid tight seal therewith.

Figure 4:
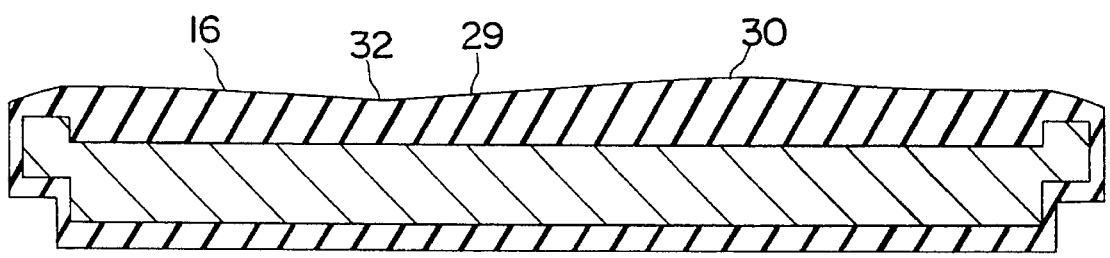
FIG. 4 is a side elevational view of an end sealing strip according to the invention.

Referring to FIGS. 1 and 4, it will be seen that engagement surfaces 29 of the end sealing strips 16, in side elevation, are of a zig-zag configuration, and disposed each in one of the end grooves 22. The end sealing strips opposing each other are complementarily shaped relative to each other, such that a peak 30 of one end sealing strip engagement surface 29 is adapted to be received by a valley 32 of the opposed end sealing strip engagement surface. Such configuration urges opposed end sealing strips to slide into complementary engagement, thereby to insure proper lengthwise orientation of the sealing means 10.

Figure 5:
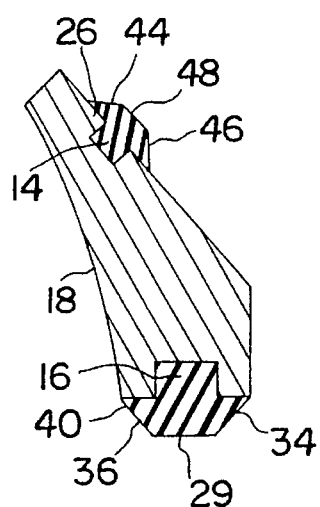
FIG. 5 is a side sectional view of a wedge member according to the invention showing its interrelationship with a sliding sealing strip and end sealing strip according to the invention.

Referring to FIG. 5 it will be seen that each of the end sealing strips 16 is, in widthwise cross section, provided with beveled edges 34, 36 leading to an engagement surface 29. The beveled edges extend beyond an end surface 40 of each of the wedge members 18, placing the engagement surface 29 in a position removed from the end surface 40. The beveled edges 34, 36 of opposing end sealing strips 16 are shaped complementarily to each other, such that, as the shell members 2, 4 are clamped together, if the end sealing strips 16 are misaligned widthwise, they are adapted to slide, one upon the other, to bring the opposed engagement surfaces 29 into engagement with each other. Thus, the unique configuration of the end sealing strips serves to align opposed end sealing strips, both lengthwise and widthwise, during clamping together of the shell members 2, 4.

In addition, the axially extending sliding sealing strips 14 are disposed in grooves 20 in the wedge members 18. Like the end sealing strips 16, the sliding sealing strips 14 are each provided with beveled edges 44, 46 and an engagement surface 48, which extend beyond the engagement surface 26 of the wedge member in which the sliding sealing strip is located.

Figure 6:
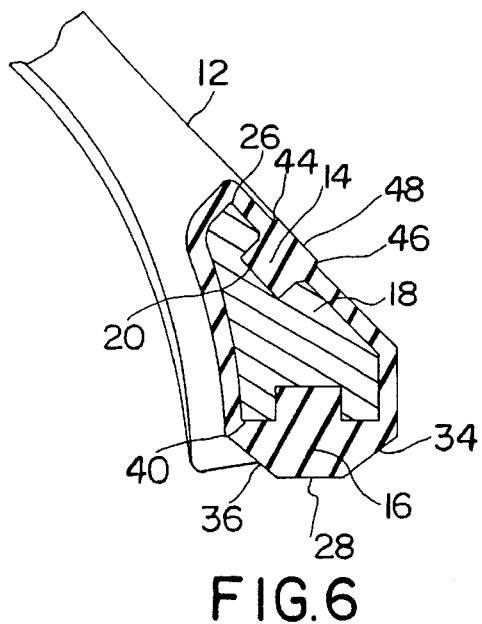
FIG. 6 is a side sectional view of a sealing assembly according to the invention wherein the material of the sealing strip has been formed over the wedge member.

Referring to FIG. 6, it will be seen that the surfaces of each of the wedge members 18 are covered by the elastomeric material from which is made the sealing assembly 10. The encapsulation of the wedge members 18 in the elastomeric material of the sealing assembly 10 provides the entire sliding surfaces of the wedge members with a more pliable wear surface and serves to preserve the wedge members, which may be of cast iron, or other metal.

Figure 7:
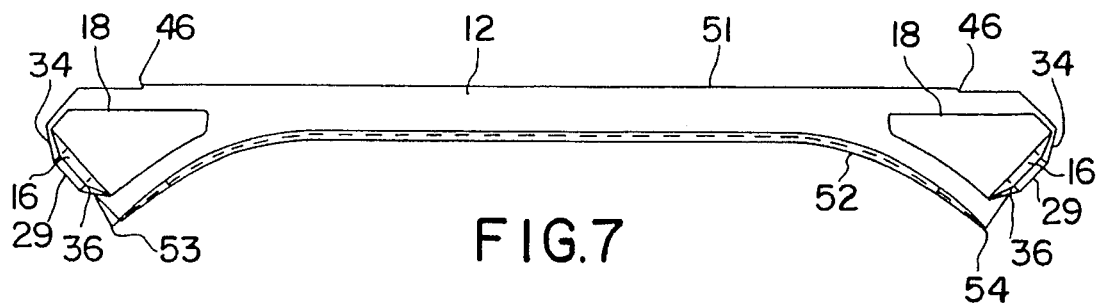
FIG. 7 is an end view of a circumferential sealing strip according to the invention.

Turning now to FIG. 7, the circumferential sealing strip 12 includes a substantially flat shell member contact surface 51, and a pipe contact surface 52. The pipe contact surface 52 of the strip has a substantially flat surface near the middle of the strip and is curved or radiused toward the ends of the strip. This radius is dimensioned to allow the strip to conform to the pipe under only minimal force during assembly, and, therefore, varies according to the size of the pipe. A radius is also formed on the ends 53, 54 of the pipe contact surface to allow the ends to slide over opposing surfaces during assembly.

In operation, as the shell members 2, 4 are drawn together by the bolts 8, the wedge members 18 are caused to slide so as to force the sealing assembly 10 inwardly in the regions of the lugs 6, to close onto the pipe. The thin middle section of the sealing strip flexes to conform to the pipe, while the radii formed on the ends of the strip 12 allow the ends to conform to the pipe. As the opposing shell members are drawn together, the end sealing strips 16 operate, by interfitting, to bring the opposed sealing assemblies 10 into lengthwise and widthwise alignment with each other. Simultaneously, the configuration of the sliding sealing strips 14 permits easy sliding of the strips along their respective shell member inner faces 28. The beveled edges 44, 46 of the sliding sealing strips 14 facilitate easy sliding along the shell member inner surface 28, and the protrusion of the sliding sealing strips 14 insures close contact with the inner surfaces 28 of the shell members 2, 4.

In instances in which the circumferential sealing strips 12 are stretched, as when the collar is used on pipe having a half circumference exceeding the length of the circumferential sealing strips 12, it is important that the sliding sealing strips 14 and the circumferential sealing strips 12 not be pulled from their respective grooves 20. Accordingly, the sealing assemblies 10 preferably are vulcanized in placed in the wedge member grooves. Once vulcanized, the bonding of the sealing means elastomeric material to the wedge member 18 exceeds the strength of the elastomeric material, such that there is no pulling of the sealing strips from the wedge member grooves.

It is to be understood that the present invention is by no means limited to the particular constructions herein disclosed and/or shown in the drawings, but also comprises any modifications or equivalents within the scope of the claims.

Having thus described my invention, what I claim as new and desire to secure by Letters Patent of the United States is:

1. In a pipe collar comprising first and second arcuate shell members, clamping means for drawing said shell members together around a pipe, first and second sealing assemblies of elastomeric material, respectively disposed interiorly of said shell members, wedge members disposed between said shell members proximate said clamping means and adapted to slide along interior surfaces of said shell members as said shell members are drawn together, each of said sealing assemblies comprising a pair of circumferential sealing strips spaced apart and interconnected by axially extending sliding sealing strips and axially extending end sealing strips, said end sealing strips being disposed within axial end grooves in said wedge members, such that a first of said wedge members having a first of said end sealing strips therein is opposed to and movable towards a second of said wedge members having a second of said end sealing strips therein, whereby engagement of said first and second end sealing strips effects a seal therebetween, the improvement in which each of said end sealing strips in side elevation is of a zig-zag configuration and disposed in one of said end grooves, said end sealing strips being complementary to each other such that a peak of said first end sealing strip is adapted to be received by a valley of said second end sealing strip and a peak of said second end sealing strip is adapted to be received by a valley of said first end sealing strip, whereby upon engagement of said first and second end sealing strips, said end sealing strips are urged into interfitting relationship, thereby to properly position said sealing assemblies lengthwise thereof.

2. The pipe collar in accordance with claim 1 in which said end sealing strips are each provided with beveled edges and an engagement surface, which edges extend beyond an end surface of said wedge member in which said end sealing strip is disposed, and extend to said engagement surface removed from said end surface.

3. The pipe collar in accordance with claim 2 in which said beveled edges of opposing ones of said end sealing strips are shaped complementarily, such that upon engagement of opposing ones of said beveled edges, said opposing end sealing strips are adapted to slide one upon the other to bring the respective engagement surfaces of said opposing end sealing strips into engagement with each other.

4. The pipe collar in accordance with claim 1 wherein surfaces of each of said wedge members comprise said elastomeric material.

5. The pipe collar in accordance with claim 4 wherein each of said wedge members is encapsulated in said elastomeric material.

6. The pipe collar in accordance with claim 3 wherein each of said wedge members is encapsulated in said elastomeric material.

7. The pipe collar in accordance with claim 2 in which said sliding sealing strips are each provided with beveled edges and an engagement surface, which sliding sealing strip edges extend beyond an arcuate shell-member engagement surface of said wedge member in which said sliding sealing strip is disposed, and extend to said sliding sealing strip engagement surface removed from said shell member engagement surface.

8. The pipe collar in accordance with claim 1 wherein said sealing means are vulcanized in said wedge members.

9. In a pipe collar comprising first and second arcuate shell members, clamping means for drawing said shell members together around a pipe, first and second sealing assemblies of elastomeric material respectively disposed interiorly of said shell members, wedge members disposed between said shell members proximate said clamping means and adapted to slide along interior surfaces of said shell members as said shell members are drawn together, each of said sealing assemblies comprising a pair of circumferential sealing strips spaced apart and interconnected by axially extending sliding sealing strips and axially extending end sealing strips, said end sealing strips being disposed within axial end grooves in said wedge members, such that a first of said wedge members having a first of said end sealing strips therein is opposed to and engagable with a second of said wedge members having a second of said end sealing strips therein, whereby engagement of said first and second end sealing strips effects a seal therebetween, the improvement in which each of said end sealing strips is provided with beveled edges and an engagement surface, which edges extend beyond an end surface of said wedge member in which said end sealing strip is disposed, and extend to said end sealing strip engagement surface removed from said wedge member end surface.

10. The pipe collar in accordance with claim 9 in which said beveled edges of opposing ones of said end sealing strips are shaped complementarily to each other, such that upon engagement of opposing ones of said beveled edges, said opposing end sealing strips are adapted to slide one upon the other to bring the respective engagement surfaces of said opposing end sealing strips into engagement with each other.

11. The pipe collar in accordance with claim 9 in which said sliding sealing strips are each provided with beveled edges and an engagement surface, which sliding sealing strip edges extend beyond an arcuate shell member engagement surface of said wedge member in which said sliding sealing strip is disposed, and extends to said sliding sealing strip engagement surface which is removed from said shell member engagement surface of said wedge member.

12. The pipe collar in accordance with claim 10 in which said sliding sealing strips are each provided with beveled edges and an engagement surface, which sliding sealing strip edges extend beyond an arcuate shell member engagement surface of said wedge member in which said sliding sealing strip is disposed and extend to said sliding sealing strip engagement surface which is removed from said shell member engagement surface of said wedge member.

13. The pipe collar in accordance with claim 12 wherein surfaces of each of said wedge members comprise said elastomeric material.

14. The pipe collar in accordance with claim 13 wherein each of said wedge members is encapsulated in said elastomeric material.

15. The pipe collar in accordance with claim 9 wherein said sealing means are vulcanized in said wedge members.

16. In a pipe collar comprising first and second arcuate shell members, clamping means for drawing said shell members together around a pipe, first and second sealing assemblies of elastomeric material respectively disposed interiorly of said shell members, wedge members disposed between said shell members proximate said clamping means and adapted to slide along interior surfaces of said shell members as said shell members are drawn together, each of said sealing assemblies comprising a pair of circumferential sealing strips spaced apart and interconnected by axially extending sliding sealing strips and axially extending end sealing strips, said end sealing strips being disposed within axial end grooves in said wedge members, such that a first of said wedge members having a first of said end sealing strips therein is opposed to and engagable with a second of said wedge members having a second of said end sealing strips therein, whereby engagement of said first and second end sealing strips effects a seal therebetween, said sliding sealing strips being disposed each in an axial groove in one of said wedge members, the improvement in which said sliding sealing strips are each provided with beveled edges and an engagement surface, which edges extend beyond a shell member engagement surface of said wedge member in which said sliding sealing strip is disposed and extend to said sliding sealing strip engagement surface which is removed from said shell member engagement surface of said wedge member.

17. The pipe collar in accordance with claim 16 in which the surfaces of each of said wedge members comprise said elastomeric material.

18. The pipe collar in accordance with claim 16 in which each of said wedge members is encapsulated in said elastomeric material.

19. The pipe collar in accordance with claim 16 wherein said sealing means are vulcanized in said wedge members.

20. In a pipe collar comprising first and second arcuate shell members, clamping means for drawing said shell members together around a pipe, first and second sealing assemblies of elastomeric material respectively disposed interiorly of said shell members, wedge members disposed between said shell members proximate said clamping means and adapted to slide along interior surfaces of said shell members as said shell members are drawn together, each of said sealing assemblies comprising a pair of circumferential sealing strips spaced apart and interconnected by axially extending sliding sealing strips and axially extending end sealing strips, said end sealing strips being disposed within axial end grooves in said wedge members, such that a first of said wedge members having a first of said end sealing strips therein is opposed to and engagable with a second of said wedge members having a second of said end sealing strips therein, whereby engagement of said first and second end sealing strips effects a seal therebetween, said sliding sealing strips being disposed each in an axial groove in one of said wedge members, the improvement in which said sealing means are each bonded to their respective wedge members by vulcanization of said sealing means in said wedge members.

* * * * *

UNITED STATES PATENT AND TRADEMARK OFFICE
CERTIFICATE OF CORRECTION

PATENT NO. : 5,605,357
DATED : February 25, 1997
INVENTOR(S) : Edwin A. Bird

It is certified that error appears in the above-indentified patent and that said Letters Patent is hereby corrected as shown below:

Col. 5, line 33, "in placed" should read -- in place -- .

Signed and Sealed this

Nineteenth Day of May, 1998

Attest:

BRUCE LEHMAN

Attesting Officer

Commissioner of Patents and Trademarks